US010184841B1

(12) United States Patent
Englert et al.

(10) Patent No.: US 10,184,841 B1
(45) Date of Patent: Jan. 22, 2019

(54) INTERFEROMETRIC TECHNIQUE FOR MEASURING UPPER ATMOSPHERIC DOPPLER WINDS UTILIZING PROJECTIONS OF A SATELLITE'S VELOCITY

(71) Applicant: THE UNITED STATES OF AMERICA, AS REPRESENTED BY THE SECRETARY OF THE NAVY, Washington, DC (US)

(72) Inventors: Christoph R. Englert, Springfield, VA (US); John M. Harlander, St. Cloud, MN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/919,252

(22) Filed: Mar. 13, 2018

(51) Int. Cl.
*G01J 9/02* (2006.01)
*G02B 6/293* (2006.01)
*G01J 3/453* (2006.01)

(52) U.S. Cl.
CPC ............ *G01J 9/02* (2013.01); *G01J 3/4531* (2013.01); *G02B 6/29349* (2013.01); *G01J 2009/0284* (2013.01)

(58) Field of Classification Search
CPC ....................................................... G01B 9/02
See application file for complete search history.

(56) References Cited

U.S. PATENT DOCUMENTS

| 5,546,309 A * | 8/1996 | Johnson ............... G01S 3/7862 244/164 |
| 2012/0274937 A1* | 11/2012 | Hays ..................... G01S 17/58 356/337 |

OTHER PUBLICATIONS

Gordley et al., Doppler wind and temperature sounder: new approach using gas filter rediometry, Journal of Applied Remote Sensing, Nov. 15, 2011, pp. 053570-1-053570-21, vol. 5, SPIE, Bellingham, WA, USA.

(Continued)

*Primary Examiner* — Jonathan M Hansen
(74) *Attorney, Agent, or Firm* — US Naval Research Laboratory; Suresh Koshy

(57) ABSTRACT

An apparatus on a satellite includes a standard fixed-path Michelson interferometer. The Michelson interferometer includes an input, at least one first output detector, and at least one second output detector. The Michelson interferometer includes a plurality of respective fields of view and a corresponding plurality of scanning azimuthal angles relative to a satellite velocity vector. The plurality of respective fields of view corresponds to a plurality of tangent points with constant tangent point height arranged around an Earth horizon circle. The apparatus includes an attitude determination and control system on the satellite, or an actuator on the satellite. The apparatus includes an input mirror and/or input optics in optical communication with the input of the Michelson interferometer. The attitude determination and control system rotates the satellite or the actuator rotates the input mirror and/or the input optics, so as to sweep through the plurality of respective fields of view around the Earth horizon circle.

20 Claims, 12 Drawing Sheets

(56) References Cited

OTHER PUBLICATIONS

Killeen et al., TIMED Doppler Interferometer (TIDI), SPIE Conference on Optical Spectroscopic Techniques and Instrumentation for Atmospheric and Space Research III, Jul. 1999, pp. 289-301, SPIE, Bellingham, WA, USA.
Hays et al., The High-Resolution Doppler Imager on the Upper Atmosphere Research Satellite, Journal of Geophysical Research, Jun. 20, 1993, pp. 10.713-10.723, vol. 98, No. D6, American Geophysical Union, John Wiley & Sons, Hoboken, NJ, USA.
Shepherd et al., WINDII, the Wind Imaging Interferometer on the Upper Atmosphere Research Satellite, Journal of Geophysical Research, Jun. 20, 1993, pp. 10.725-10.750, vol. 98, No. D6, American Geophysical Union, John Wiley & Sons, Hoboken, NJ, USA.
Englert et al., Doppler asymmetric spatial heterodyne spectroscopy (DASH): concept and experimental demonstration, Applied Optics, Oct. 8, 2007, pp. 7297-7307, vol. 46, No. 29, Optical Society of America, Washington, DC, USA.
Englert et al., Spatial Heterodyne Imager for Mesospheric Radicals on STPSat-1, Journal of Geophysical Research, Oct. 22, 2010, pp. 1-20, vol. 115, No. D20306, American Geophysical Union, John Wiley & Sons, Hoboken, NJ, USA.

* cited by examiner

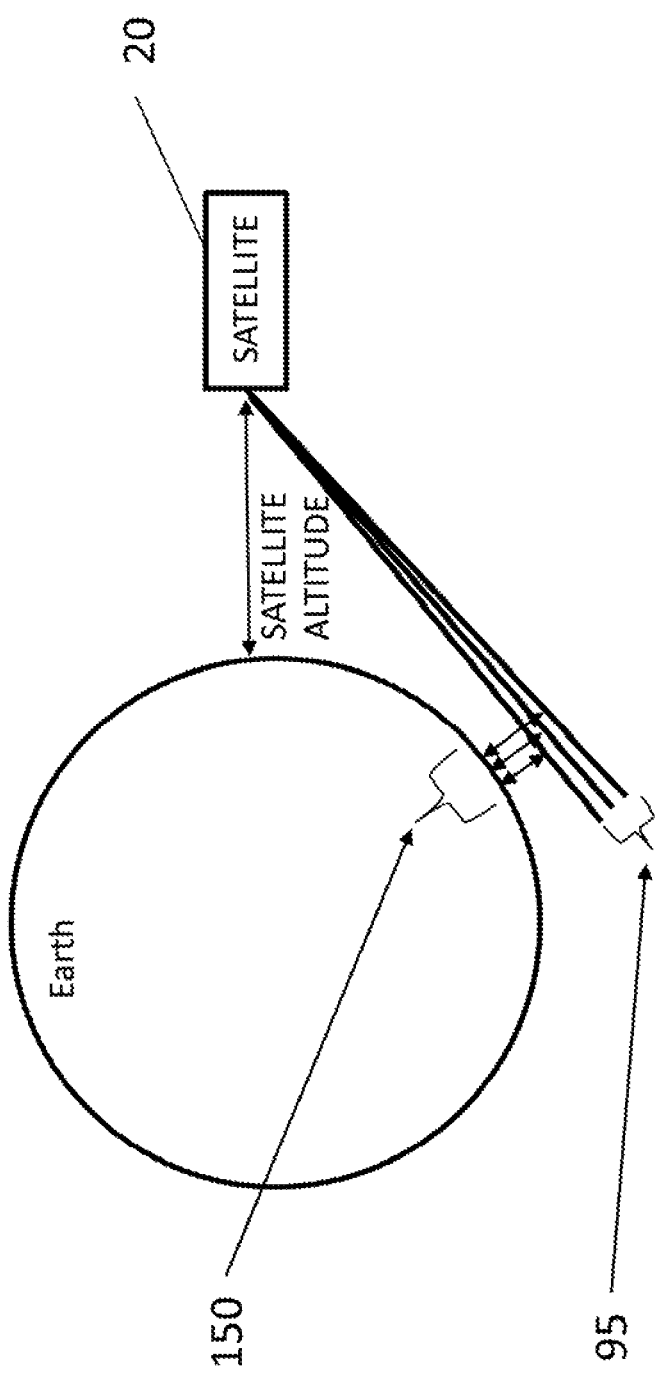

INTERFEROMETRIC TECHNIQUE FOR MEASURING UPPER ATMOSPHERIC DOPPLER WINDS UTILIZING PROJECTIONS OF A SATELLITE'S VELOCITY

BACKGROUND OF THE INVENTION

Field of the Invention

This invention relates in general to a method and/or apparatus for measuring atmospheric wind, and in particular to a method and/or apparatus for determining passive Doppler wind measurements using a satellite-based instrument.

Description of the Related Art

Atmospheric wind observations with optical remote sensing techniques that measure Doppler shift have a long heritage. To date, space-based optical measurements of winds in the Earth's atmosphere have been performed using either Fabry-Perot interferometers or Michelson interferometers. In 2018, NASA is expected to launch the Ionospheric Connection Explorer ("ICON"), a satellite in low-Earth orbit, which includes an airglow-measuring instrument known as the Michelson Interferometer for Global High-resolution Thermospheric Imaging ("MIGHTI"). MIGHTI was designed and built by the U.S. Naval Research Laboratory, and it uses the Doppler Asymmetric Spatial Heterodyne ("DASH") technique discussed in U.S. Pat. No. 7,773,229, incorporated herein by reference, to measure winds. Conventional space-based optical measurements of winds employing Fabry-Perot interferometers or Michelson interferometers use a limb-viewing geometry to detect the Doppler shift of discrete atmospheric emission lines caused by the bulk velocity along the line of sight at the tangent layer. The horizontal wind vector is determined by combining two measurements of the same air mass with orthogonal look directions, typically taken several minutes apart, 45° and 135° from the ram direction of the satellite.

Fabry-Perot Heritage

The High Resolution Doppler Imager ("HRDI") is an instrument on board NASA's Upper Atmospheric Research Satellite ("UARS"), which was launched on 12 Sep. 1991 as a part of NASA's effort to study the Earth's stratosphere and mesosphere. The TIMED Doppler Interferometer ("TIDI") is an instrument on board NASA's Thermosphere Ionosphere Mesosphere Energetics and Dynamics ("TIMED") satellite, which was launched on 7 Dec. 2001 to study the Earth's Mesosphere and Lower Thermosphere. HRDI and TIDI utilize a triple and a single Fabry-Perot interferometer, respectively, to measure emissions having wavelengths (λ) between 550-900 nm.

The Fabry-Perot instruments utilize one or multiple etalons in series to isolate and spectrally resolve the emission line(s) of interest. The spectrum over a narrow wavelength range is obtained directly by imaging the ring pattern produced by the interferometer on a position sensitive detector. Once the spectrum is obtained, the wind speed can be derived from the line position. The temperature can be determined from either the line width or a line ratio. The biggest technical challenge for the Fabry-Perot instruments lies in achieving the required etalon alignment tolerances (better than ~λ/20) and maintaining this alignment during flight. Although many spectral resolution elements are measured in parallel, the solid angle Ω for a single resolution element is determined by the resolving power R (i.e. Ω=2π/R) which can be small at the resolving power required for Doppler measurements. Since the high resolving power necessitates a small solid angle, a large interferometer aperture may be required to obtain adequate signal on faint emissions. This results in a larger, heavier instrument.

Stepped Michelson Heritage

The Wind Imaging Interferometer ("WINDII") was launched on NASA's UARS on 12 Sep. 1991 and operated until 2003. WINDII used an all-glass, field-widened, chromatically, and thermally compensated, phase-stepped Michelson interferometer (also termed Stepped Fourier Transform Spectrometer or stepped FTS). Several other versions of phase-stepped interferometers have been built or proposed for the measurement of telluric winds and winds on Mars.

The basic principle behind all phase-stepped Michelson interferometers is to measure a minimum of three, but typically four, interferogram points of a single isolated atmospheric emission line. The phase points are spaced by ~λ/4 (90°) about a step (or offset) in optical path difference ("OPD") that is large enough to be sufficiently sensitive to both wind speed, which results in a phase shift at high OPD, and temperature, which results in a variation in modulation depth.

This basic principle is illustrated with reference by way of illustration to FIG. 1, which shows a stylized, schematic interferogram as it would be recorded by a conventional scanning Michelson interferometer viewing an isolated, single, temperature-broadened, Gaussian emission line. The carrier frequency of the fringe pattern is determine by the central wavenumber of the emission, which is Doppler shifted by the wind speed. For a predominantly temperature broadened line, the width of the interferogram envelope is a measure of the temperature, with a higher temperature corresponding to a narrower envelope. Zero path difference is at the center of the plot, where the visibility of the fringes is maximal, and the maximum path difference is at the edges. The thin curve in the plot shows the intensity vs. optical path difference for a Gaussian emission line as it would be recorded by a scanning Michelson interferometer scanned over the path difference shown. The thick curve in the plot illustrates the residual obtained by taking the difference between two interferograms each corresponding to a different wind speed, which causes them to have slightly different carrier frequencies. The maximum response of the measurement to wind speed is at path difference $P_{OPT}$ where the amplitude of the difference signal is maximal. Assuming a temperature broadened, Gaussian line profile with width $\sigma_D$:

$$\sigma_D = \sigma_0 \sqrt{\frac{kT}{mc^2}} \quad (1)$$

the optimum path difference is:

$$P_{OPT} = \frac{1}{2\pi\sigma_D} \quad (2)$$

where $\sigma_0$ is the wavenumber of the line center, k is Boltzmann's constant, m is the molecular or atomic mass of the emission source, T is the temperature, and c is the speed of light. One of ordinary skill in the art will readily appreciate that the fringe frequency in FIG. 1 has been greatly reduced for ease of illustration and understanding. A real interferogram taken with a Michelson interferometer for an emission line in the visible spectral range would produce on the order of $10^5$ fringes between path differences 0 and $P_{OPT}$ under typical atmospheric conditions.

Determining Doppler shifts with a phase-stepped Michelson interferometer requires the isolation of a single emission line with a pre-filter. A fit of the interferogram phase at the four measured samples is then possible, which can subsequently be used to determine the Doppler frequency shift. If the line is spectrally close to other emissions in the spectrum, the pre-filter has to be extremely narrow, which can be achieved by an additional, standard, Fabry-Perot etalon prefilter, with all of its attendant difficulties and the resulting reduction in throughput.

Several stepped FTS techniques have been used to measure the four phase points. The WINDII instrument uses piezoelectric actuators to move one mirror of the interferometer. The Mesospheric Imaging Michelson Interferometer. ("MIMI") instrument uses a segmented mirror with four sections at different OPD, which avoids moving the mirror. The Waves Michelson Interferometer ("WAMI") version, designed for the Earth's atmosphere, proposes a moving, segmented mirror, allowing the simultaneous measurement of two emission lines with a two-step mirror scan. A phase-stepped Michelson interferometer has also been proposed for Mars using a non-segmented, mirror moved by piezo actuators.

BRIEF SUMMARY OF THE INVENTION

An embodiment of the invention includes an apparatus on a standard satellite orbiting the Earth. For example, the satellite includes a standard, low-earth orbit ("LEO") satellite. For example, the LEO satellite includes a standard n-unit CubeSat, wherein n is at least one. The apparatus includes a standard fixed-path Michelson interferometer on the satellite. The Michelson interferometer includes an input, at least one first output detector, and at least one second output detector. Optionally, the input of the Michelson interferometer receives red or green airglow emission lines of atomic oxygen. The Michelson interferometer includes a plurality of respective fields of view and a corresponding plurality of scanning azimuthal angles relative to a satellite velocity vector. The plurality of respective fields of view corresponds to a plurality of tangent points at constant tangent point heights arranged around an Earth horizon circle. Each field of view forms a 90° angle with a line segment from the center of the earth to the tangent point, as indicated by way of illustration in FIG. 2A. The apparatus includes an attitude determination and control system on the satellite, or an actuator on the satellite. The apparatus 10 includes an input mirror and/or input optics in optical communication with the input of the Michelson interferometer. In an embodiment of the invention, the attitude determination and control system rotates the satellite so as to sweep through the plurality of respective fields of view around the Earth horizon circle. In another embodiment of the invention, the actuator rotates the input mirror and/or the input optics so as to sweep through the plurality of respective fields of view around the Earth horizon circle.

Another embodiment of the invention includes a method of determining atmospheric wind speed. A fixed-path Michelson interferometer is provided on a satellite. The Michelson interferometer includes an input, at least one first output detector, and at least one second output detector. The Michelson interferometer includes a plurality of respective fields of view and a corresponding plurality of scanning azimuthal angles from a satellite velocity vector. The plurality of respective fields of view correspond to a plurality of tangent points at constant tangent point heights on an Earth horizon circle. The plurality of respective fields of view is swept through and around the Earth horizon circle by rotating the satellite using a standard attitude determination and control system. In another embodiment of the invention, the plurality of respective fields of view is swept through and around the Earth horizon circle by rotating, using a standard actuator, an input mirror and/or input optics communicating with the input of the Michelson interferometer. First raw detector data are detected using the at least one first output detector. Second raw detector data are detected using the at least one second output detector. A combined interferogram is generated based on the first raw detector data and the second raw detector data. An unwrapped phase is determined from the combined interferogram. A zero wind phase is determined. The unwrapped phase is corrected based on the zero wind phase. A wind-induced fringe phase difference is generated by subtracting a satellite velocity-induced fringe phase from the corrected unwrapped phase. A wind speed vector component for the each respective field of view of the plurality of respective fields of view is generated from the wind-induced fringe phase difference.

Advantageously, an embodiment of the invention benefits from reduced telemetry. Unlike more complex systems requiring imaging detectors, this embodiment of the invention requires only two single channel detectors (or only three, if a separate background channel is monitored), which greatly reduces the data volume.

Advantageously, an embodiment of the invention has no moving parts. For example, this embodiment of the invention does not require any moving optical components, which permits construction thereof in a compact, robust way, making it suitable for space flight. Advantageously, in another embodiment of the invention including a rotating input mirror, there are no moving interferometer parts.

Advantageously, an embodiment of the invention enables simultaneous observations at different altitudes. With appropriate imaging optics and one-dimensional imaging sensors at the outputs of an interferometer according to this embodiment of the invention, multiple spatial elements on the limb can be observed simultaneously, providing altitude resolution, while using fewer spacecraft resources than conventional techniques. This advantage stems from measuring the interferogram temporally rather than spatially. Conventional techniques (e.g. stepped FTS, Fabry-Perot, and DASH) typically require two-dimensional imaging sensors to obtain altitude resolution on the limb. For example, in DASH, one detector dimension is used for spectral information and the other for spatial information.

Advantageously, an embodiment of the invention exhibits improved etendue, or sensitivity relative to prior art devices. An interferometer according to this embodiment of the invention can be field-widened and has large interferometric throughput. Furthermore, the full etendue is recorded by just two single channel detectors. This means that the signal on each of the detectors will be much larger than in conventional techniques wherein the etendue is divided across many pixels of an imaging sensor (e.g., SHS, DASH). Due to the brighter signal, the interferometer according to this embodiment of the invention is able employ detectors with much higher dark current, requiring fewer satellite resources for detector cooling.

Advantageously, an embodiment of the invention provides improved atmospheric temperature information relative to prior art devices. Atmospheric temperature information is retrieved in addition to the wind field information, using the temperature dependence of the interferogram contrast (i.e., fringe amplitude), which includes information about the line shape.

Advantageously, an embodiment of the invention exhibits reduced thermal drifts relative to prior art devices. Thermal effects on a measured phase are mitigated in an interferometer according to an embodiment of the invention using materials that provide maximum thermal compensation, such as have been successfully demonstrated for stepped FTS. In addition, the above mentioned methods for phase tracking are used to quantify and ultimately correct at least some of the remaining thermal effects.

BRIEF DESCRIPTION OF THE DRAWINGS

FIG. 2B is an illustrative diagram of a satellite including an embodiment of the invention and orbiting the earth, the diagram showing this embodiment's fields of view relative to the tangent point height.

DETAILED DESCRIPTION OF THE INVENTION

Figure 1:
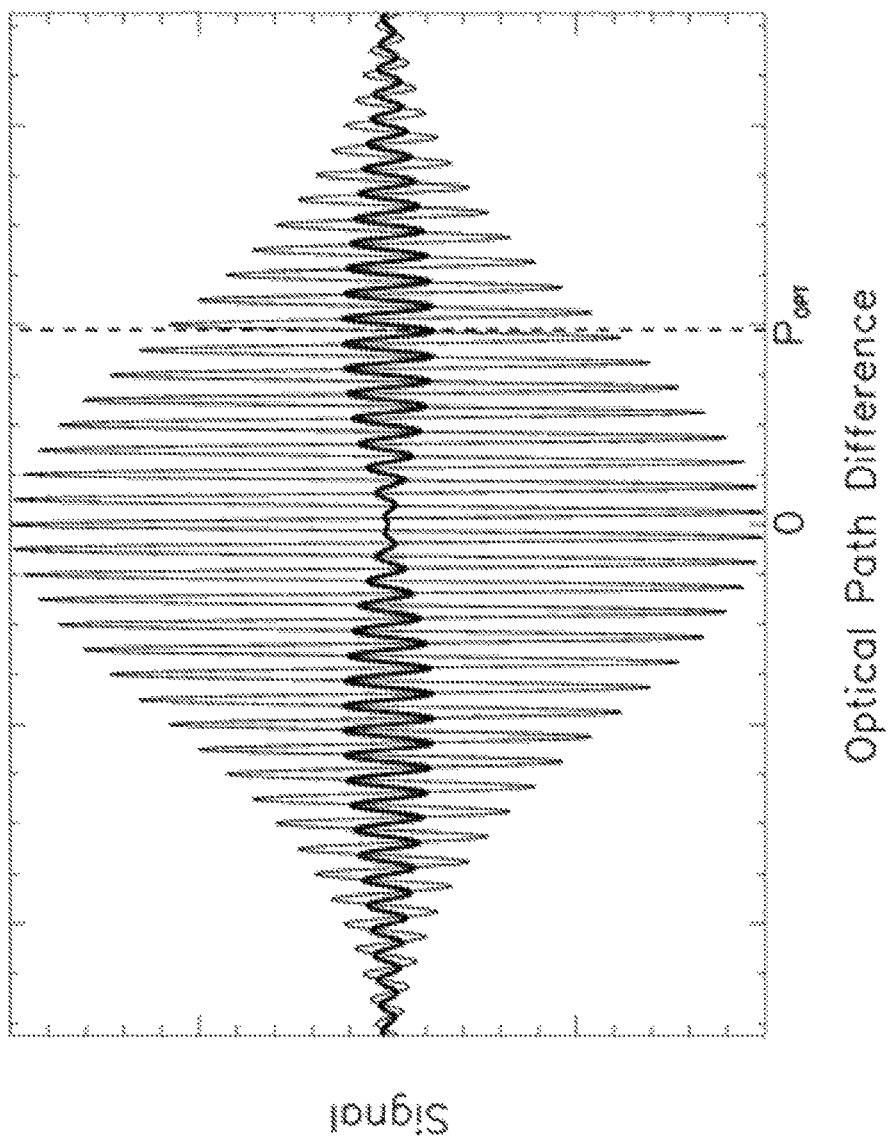
FIG. 1 is an illustrative interferogram for an isolated Gaussian emission line, and the difference of two interferograms with slightly different spatial frequency
Figure 2A:
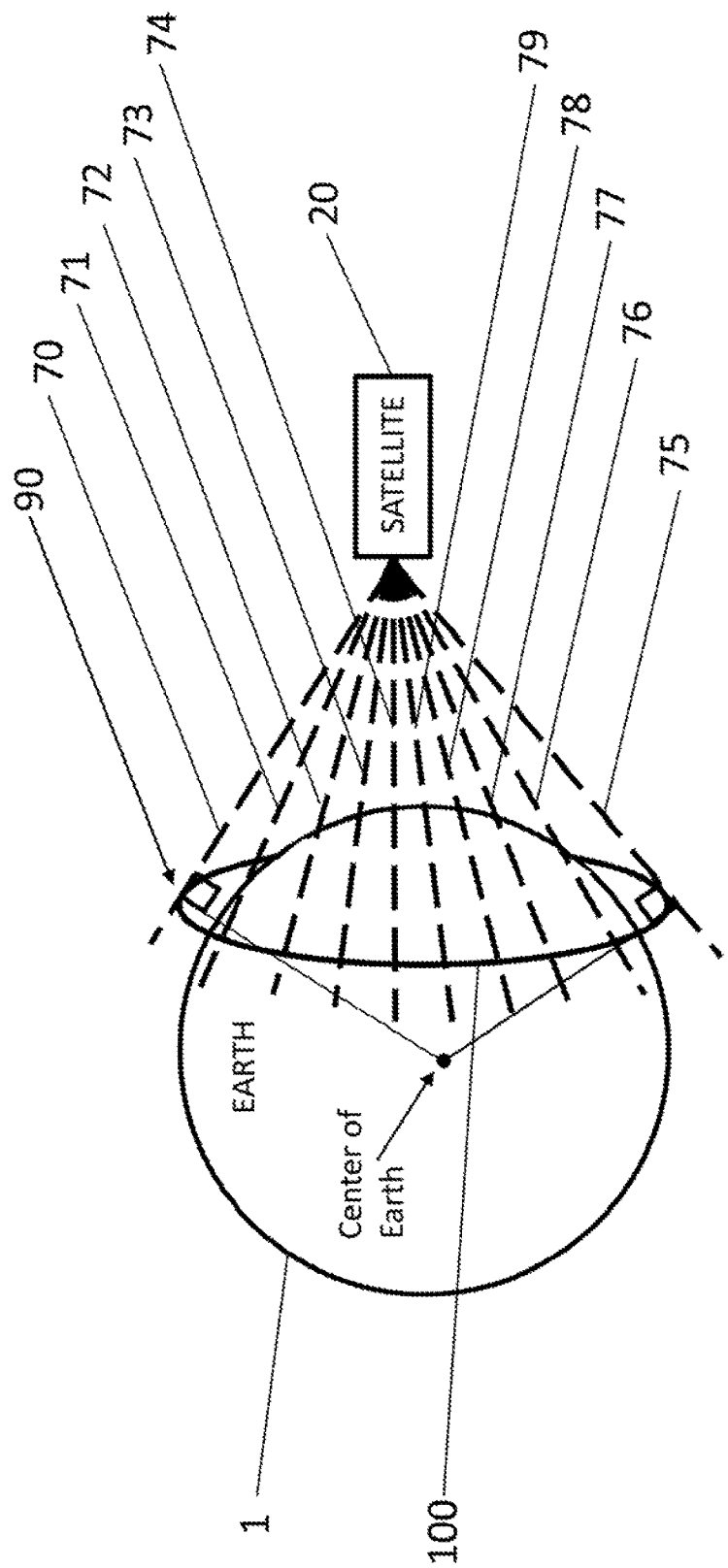
FIG. 2A is an illustrative diagram of a satellite including an embodiment of the invention and orbiting the earth, the diagram showing schematically this embodiment's fields of view relative to the Earth horizon circle.
Figure 3:
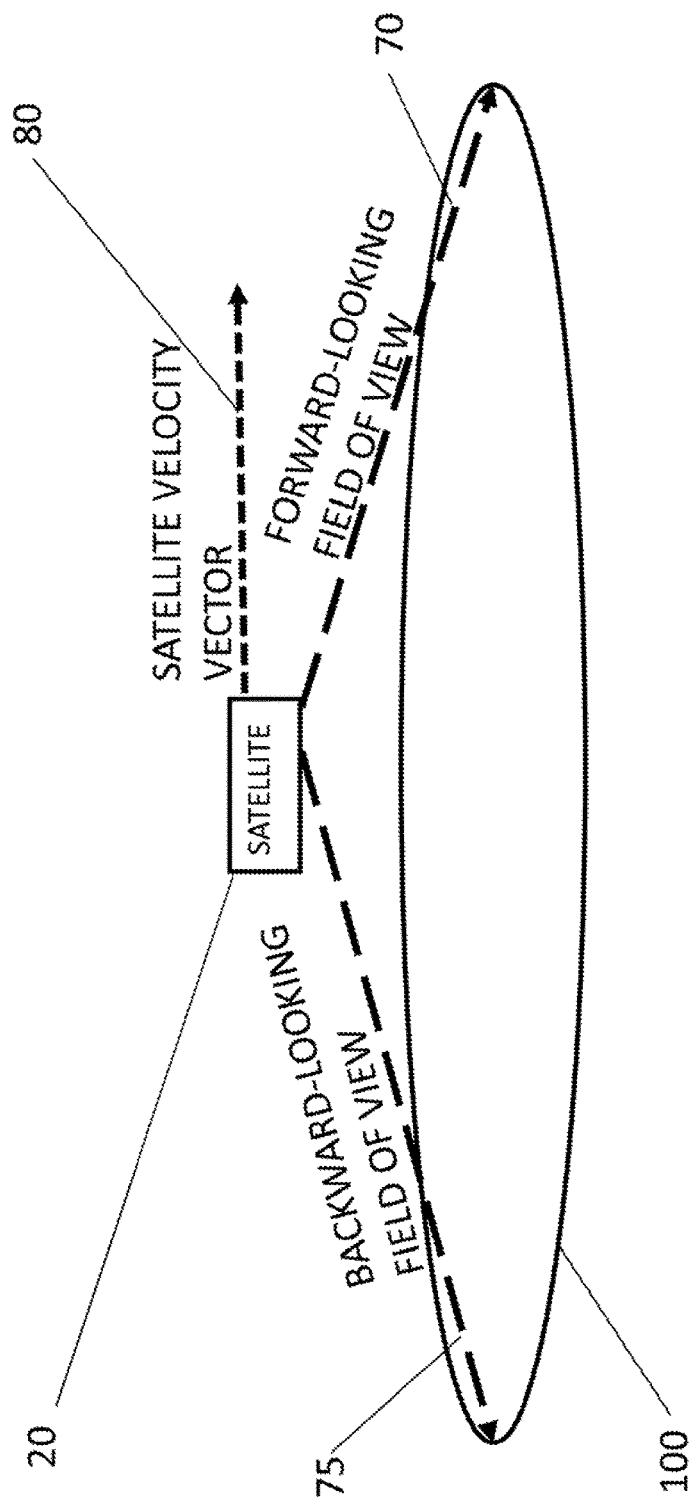
FIG. 3 is an illustrative diagram of a satellite including an embodiment of the invention, the diagram showing this embodiment's fields of view relative to the Earth horizon circle and showing a track of field of view along a constant tangent point height on the Earth horizon circle.

An embodiment of the invention includes an apparatus 10 on a standard satellite 20 orbiting the Earth 1, as shown by way of example in FIGS. 1-5. For example, the satellite includes a standard, low-earth orbit ("LEO") satellite. For example, the LEO satellite includes a standard n-unit CubeSat, wherein n is at least one. The apparatus 10 includes a standard fixed-path Michelson interferometer 30 on the satellite 20, as shown by way of example in FIGS. 6 and 7. The Michelson interferometer 30 includes an input 40, at least one first output detector 50, and at least one second output detector 60. Optionally, the at least one first output detector 50 and/or the at least one second output detector 50 includes a standard charge-coupled device, a standard complementary metal-oxide semiconductor detector, or a standard photodiode.

The input 40 of the Michelson interferometer 30 receives airglow emission lines, or signal, of an atmospheric constituent. For example, the input 40 receives airglow emission lines of an atomic or molecular constituent in the atmosphere, such as atomic or molecular oxygen. The Michelson interferometer 30 includes a plurality of respective fields of view 70-79 and a corresponding plurality of scanning azimuthal angles relative to a satellite velocity vector 80, as shown by way of illustration in FIGS. 2A, 2B, and 3. One of ordinary skill in the art will readily appreciate that only ten fields of view are shown by way of illustration in FIG. 2A for ease of illustration and understanding. One of ordinary skill in the art will readily appreciate that the actual number of fields of views depends, in part, on the user's desired resolution of wind measurements in the atmosphere. The plurality of respective fields of view 70-79 corresponds to a plurality of tangent points 90 at constant tangent point heights 150 arranged around an Earth horizon circle 100, as shown by way of illustration in FIG. 2B. The apparatus 10 includes are attitude determination and control system 110 on the satellite 20, or an actuator 120 on the satellite. The apparatus 10 includes an input mirror 130 and/or input optics 140 in optical communication with the input of the Michelson interferometer 30.

Optionally, the plurality of respective fields of view includes a forward-looking field of view 70 and a backward-looking field of view 75. The forward-looking field of view 70 includes a forward-looking Doppler shift-induced frequency. The backward-looking field of view 75 includes a backward-looking Doppler shift-induced frequency. The Michelson interferometer 30 includes a path difference sufficient to generate a plurality of interference fringes between the forward-looking Doppler shift-induced frequency and the backward-looking Doppler shift-induced frequency.

Figure 4:
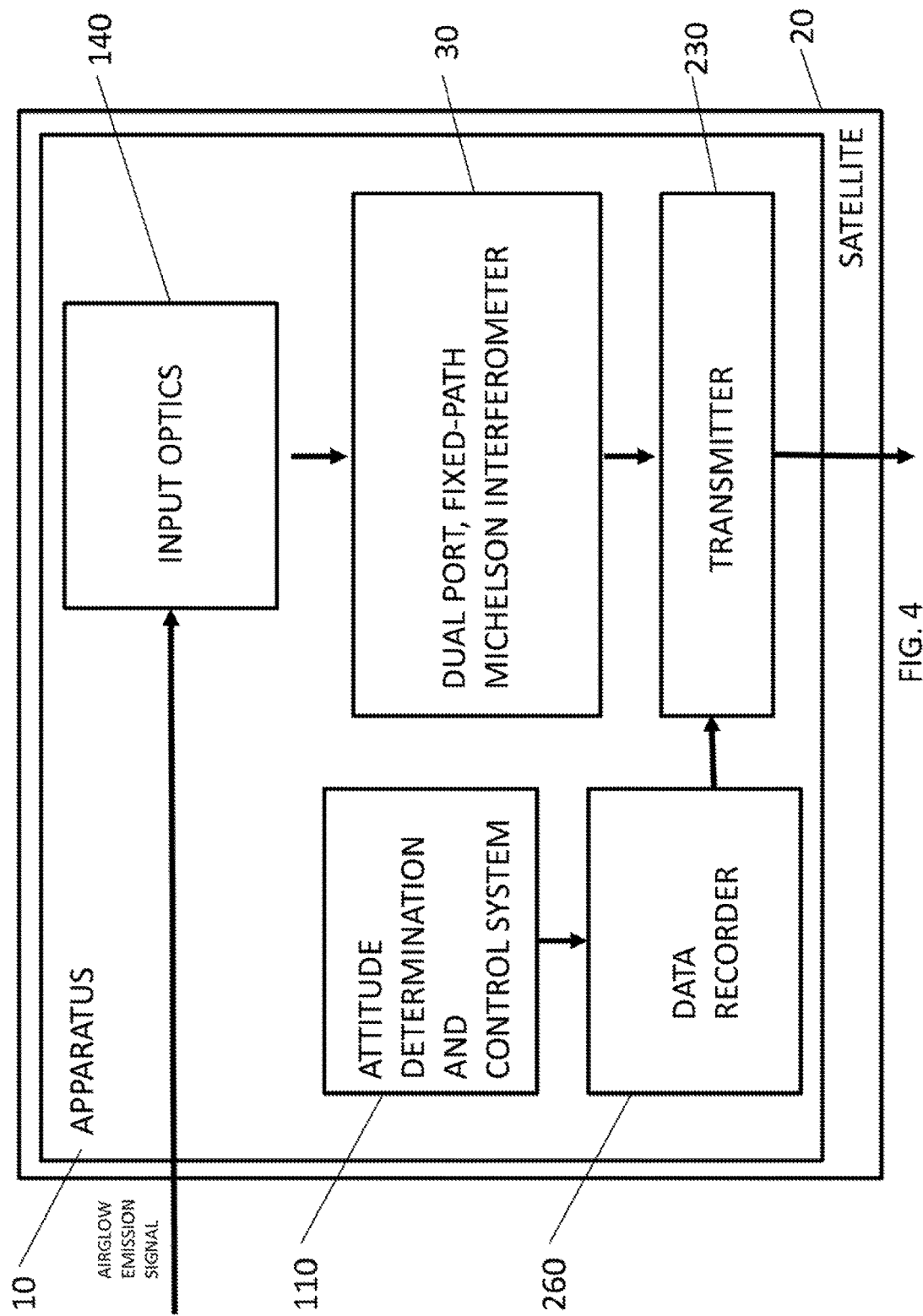
FIG. 4 is a block diagram of an embodiment of the invention onboard a satellite and including an attitude determination and control system rotating the satellite.

In an embodiment of the invention, as shown by way of example in FIG. 4, the attitude determination and control system 110 rotates the satellite 20 so as to sweep through the plurality of respective fields of view around the Earth horizon circle 100. Optionally, the attitude determination and control system 110 includes a plurality of standard thrusters, a plurality of standard reaction wheels, a standard global positioner, and/or a standard star tracker.

Figure 5:
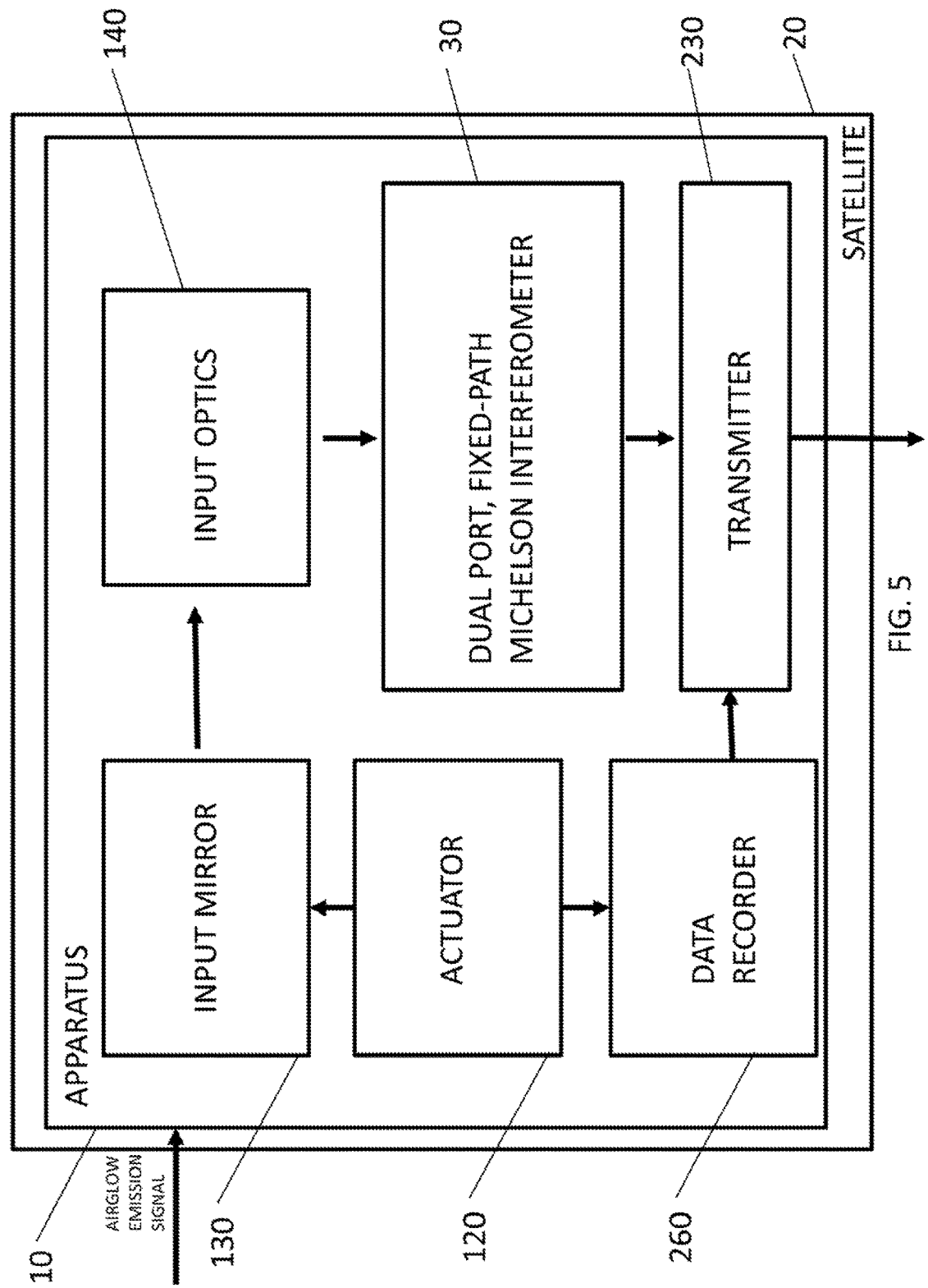
FIG. 5 is a block diagram of an embodiment of the invention onboard a satellite and including an actuator rotating an input mirror and/or input optics for a Michelson interferometer.

In another embodiment of the invention, as shown by way of example in FIG. 5, the actuator 120 rotates the input mirror 130 and/or the input optics 140 so as to sweep through the plurality of respective fields of view around the Earth horizon circle 100. Optionally, the actuator 120 includes a standard stepped-motion motor or a standard continuous motion motor.

Optionally, the Earth includes a limb, which is the edge of the Earth at a tangent height at the horizon, as seen, from a spacecraft, such as the satellite 20. Each respective field of view of the plurality of respective fields of view includes a plurality of vertical field-of-view segments 95. The plurality of field-of-view segments 95 respectively corresponds to a plurality of tangent point heights 150 for a plurality of lines-of-sight across the limb of the Earth, as shown by way of illustration in FIG. 2B. One of ordinary skill in the art will readily appreciate that only three tangent point heights are shown for ease of understanding and illustration. One of ordinary skill in the art will readily appreciate that the actual number of vertically arranged fields of view segments depends on the user's desired vertical resolution of wind measurements in the atmosphere. The at least one first output detector 50 includes a plurality of standard, stacked first output detectors. Each first output detector of the plurality of stacked first output detectors corresponds to a respective field-of-view segment of the plurality of field-of-view segments. The each first output detector of the plurality of stacked first output detectors corresponds to a respective tangent point height of the plurality of tangent point heights 150. The at least one second output detector 60 includes a plurality of stacked second output detectors corresponding to the plurality of stacked first output detectors. Each second output detector of the plurality of stacked second output detectors corresponding to the respective field-of-view segment of the plurality of field-of-view segments 95. The each second output detector of the plurality of stacked second output detectors corresponding to the respective tangent point height of the plurality of tangent point heights.

Figure 6:
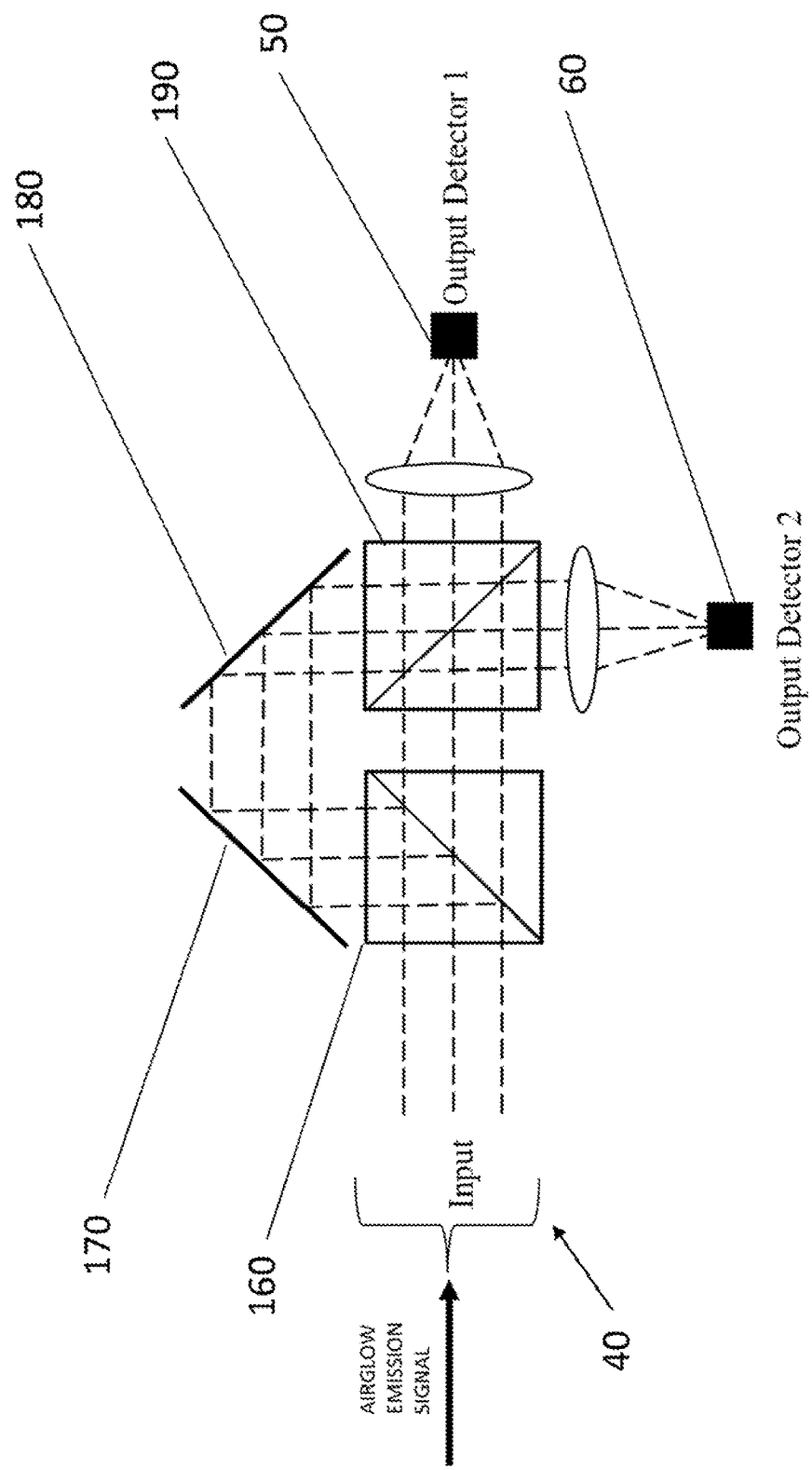
FIG. 6 is a schematic diagram of a Michelson interferometer according to an embodiment of the invention.

Optionally, the Michelson interferometer 30 includes a standard, first beam splitter 160 Communicating with the input 40 of the Michelson interferometer, as shown by way of example in FIG. 6, the dashed lines being conceptual light rays. A standard, first interferometer mirror 170 optically communicates with the first beam splitter 160. A standard, second interferometer mirror 180 communicates with the first interferometer mirror 170. A standard, second beam splitter 190 communicates with the first beam splitter 160 and the second interferometer mirror 180. The at least one first output detector 50 and the at least one second output detector 60 communicate with the second beam splitter 190 via respective optics.

Figure 7:
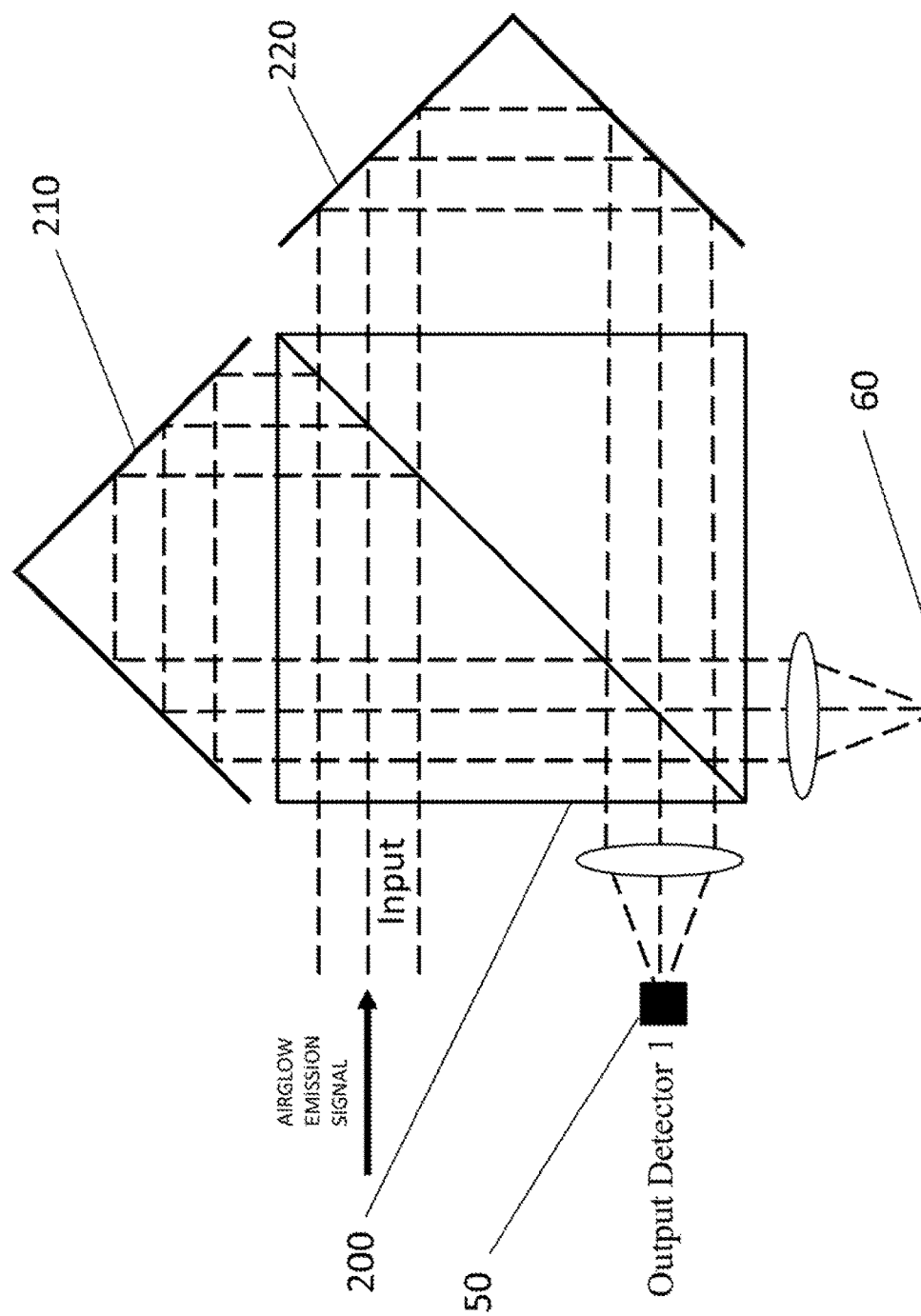
FIG. 7 is a block diagram of another Michelson interferometer according to an embodiment of the invention.

Optionally, the Michelson interferometer 30 includes a standard, single beam splitter 200 including a first surface and a second surface, as shown by way of example in FIG. 7, the dashed lines being conceptual light rays. A standard, first roof top mirror 210 communicates with the single beam splitter 200 via the first surface. A standard, second roof top mirror 220 communicates with the single beam splitter via the second surface. The at least one first output detector 50 and the at least one second output detector 60 communicate with the single beam splitter 200.

Figure 8:
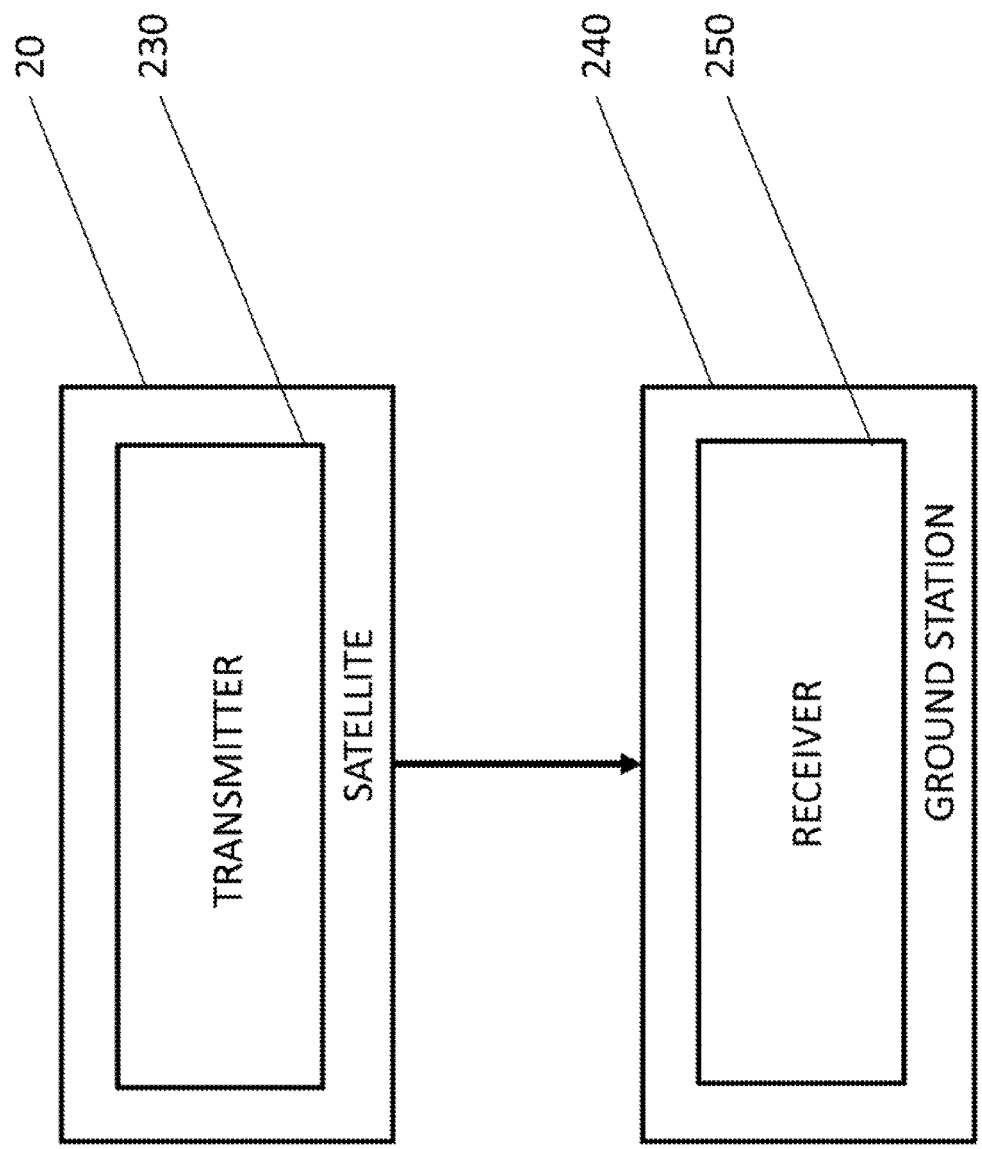
FIG. 8 is a block diagram of an embodiment of the invention including a transmitter and a receiver.

Optionally, the satellite 20 includes a standard satellite communications transmitter 230, which communicates with a standard satellite communications receiver 240 at a standard ground station 250, as shown by way of example in FIG. 8. On the satellite, the satellite communications transmitter communicates with the Michelson interferometer and/or a standard data recorder 260, as shown by way of examples in FIGS. 4 and 5. The data recorder 260 communicates with the attitude determination and control system 110 or the actuator 120 to store data concerning satellite position, satellite attitude, satellite velocity, time, and/or Michelson interferometer field of view direction. For example, the satellite communications transmitter 230 includes a standard radio frequency transmitter or a standard optical communications transmitter. For example, the satellite communications receiver includes a standard radio frequency receiver or a standard optical communications receiver.

Another embodiment of the invention includes a method of determining atmospheric wind speed. A fixed-path Michelson interferometer 30 is provided on a satellite. The Michelson interferometer 30 includes an input 40, at least one first output detector 50, and at least one second output detector 60. The Michelson interferometer 30 includes a plurality of respective fields of view 70-79 and a corresponding plurality of scanning azimuthal angles from a satellite velocity vector 80. The plurality of respective fields of view correspond to a plurality of tangent points with constant tangent point heights 150 on an Earth horizon circle 100. The plurality of respective fields of view is swept through and around the Earth horizon circle 100 by rotating the satellite 20 using a standard attitude determination and control system 110. In another embodiment of the invention, the plurality of respective fields of view is swept through and around the Earth horizon circle 100 by rotating, using a standard actuator 120, an input mirror 130 and/or input optics 140 communicating with the input 40 of the Michelson interferometer 30. First raw detector data are detected using the at least one first output detector 50. Second raw detector data are detected using the at least one second output detector 60. A combined interferogram is generated based on the first raw detector data and the second raw detector data. An unwrapped phase is determined from the combined interferogram. A zero wind phase is determined. The unwrapped phase is corrected based on the zero wind phase. A wind-induced fringe phase difference is generated by subtracting a satellite velocity-induced fringe phase from the corrected unwrapped phase. A wind speed vector component for the each respective field of view of the plurality of respective fields of view is generated from the wind-induced fringe phase difference.

Optionally, the plurality of respective fields of view and the corresponding plurality of view angles around the Earth horizon circle are detected using the attitude determination and control system 110, or the actuator 120.

Optionally, the first raw detector data and the second raw detector data are correlated with the corresponding plurality of view angles. A first calibrated signal is generated from the first raw detector data for each view angle of the plurality of view angles. A second calibrated signal is generated from the second raw detector data for the each view angle of the plurality of view angles along the Earth horizon circle 100. A total unmodulated signal is calculated from the first calibrated signal and the second calibrated signal for the each view angle of the plurality of view angles. A first modulated signal is generated for the each view angle of the plurality of view angles by subtracting the total unmodulated signal from the first calibrated signal. A second modulated signal is generated by subtracting the total unmodulated signal from the second calibrated signal. Optionally, the first modulated signal and the second modulated signal are corrected for brightness differences in a standard manner along the horizon circle. Optionally, the correcting the first modulated signal and the second modulated signal for brightness differences includes dividing the first modulated signal by the total unmodulated signal and dividing the second modulated signal by the total unmodulated signal. Optionally, the generating the combined interferogram includes subtracting the first modulated signal from the second modulated signal.

Optionally, the first raw detector data, the second raw detector data, the plurality of respective fields of view, and the corresponding plurality of view angles are time-tagged. The first raw detector data are matched using their time tags to the plurality of respective fields of view, and the corresponding plurality of view angles. The second raw detector data are matched using their time tags to the plurality of respective fields of view, and the corresponding plurality of view angles.

Optionally, the first raw detector data is corrected by subtracting at least one first detector dark current signal, at least one first bias signal, and/or at least one first spurious signal from one of at least one energetic particle and cosmic radiation from the first raw detector data. Likewise, the second raw detector data is corrected by subtracting at least one second detector dark current signal, at least one second bias signal, and/or at least one second spurious signal from the one of at least one energetic particle and cosmic radiation from the second raw detector data. Optionally, the generating the first calibrated signal and generating the second calibrated signal includes calibrating the at least one first output detector based on the corrected first raw detector data and calibrating the at least one second output detector based on the corrected second raw detector data to ensure equal and linear sensitivity.

Optionally, the calculating a total unmodulated signal includes averaging the first calibrated signal and the second calibrated signal.

Another embodiment of the invention is described as follows. This embodiment of the invention includes a Michelson interferometer 30 having a fixed path difference, as shown by way of examples in FIGS. 6 and 7. Instead of modulating the path difference within the interferometer, the wavelength of the isolated atmospheric line is modulated, which effectively scans the interference pattern through the fixed interferometer path. Referring to FIG. 1, this corresponds to a stretching and shrinking of the interferogram in the horizontal direction of the figure. For a satellite that is moving at a high speed with respect to the Earth's surface, e.g., a satellite in Low Earth Orbit ("LEO"). Applicants recognized that the source wavelength modulation can be accomplished by viewing the atmosphere at varying angles with respect to the spacecraft velocity. Applicants further recognized that such source wavelength modulation can be accomplished because the projection of the spacecraft's velocity onto the field of view of the instrument results in a varying Doppler shift of the source wavelength with view direction. Applicants additionally recognized that if the view direction is varied continuously (e.g., by rotating the instrument field of view 360° in azimuth in a circular fashion while continuously viewing the Earth's limb), the source wavelength would be modulated periodically and brightness exiting the interferometer would vary accordingly. As an example, for a typical LEO satellite speed of 7500 m/s, a wavelength of 630 nm, and an interferometer path difference of 5 cm, approximately ~4 interference fringes will be scanned as the Michelson interferometer 30 observes from spacecraft ram (same azimuth angle as the satellite velocity vector) to wake (same azimuth angle as the satellite anti-velocity vector) directions. For the purpose of this specification, the ram direction refers to the direction having the same azimuth angle as the satellite velocity vector 80; by extension, the wake direction refers to the direction having the same azimuth angle as the satellite anti-velocity vector direction.

The Michelson interferometer scanning in the ram direction and the wake direction serves to scan the same atmospheric volume in a sufficiently short time span such that atmospheric wind speed within the atmospheric volume is constant for practical purposes.

Determining the Atmospheric Wind Speed

Figure 9A:
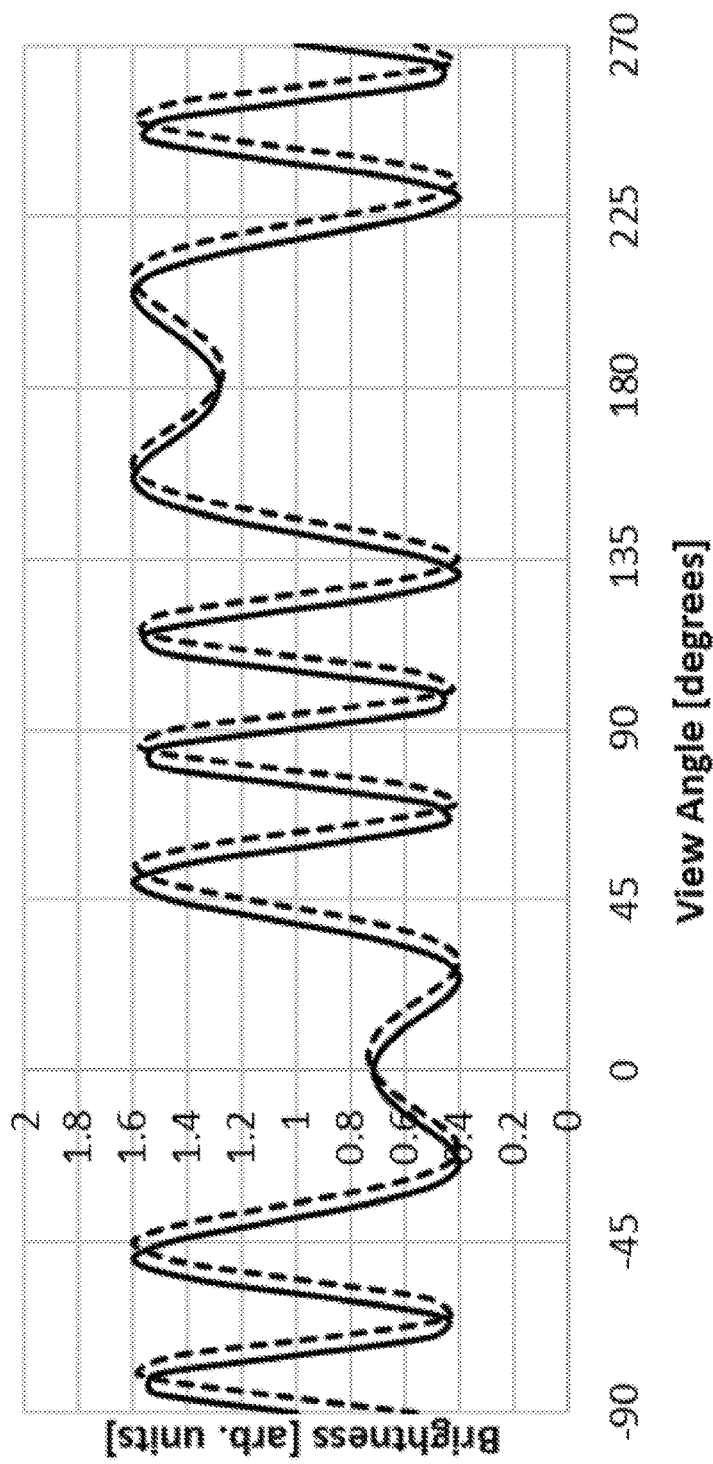
FIG. 9A is an illustrative fringe pattern plot for the output of the first output detector of the Michelson interferometer according to an embodiment of the invention.
Figure 9B:
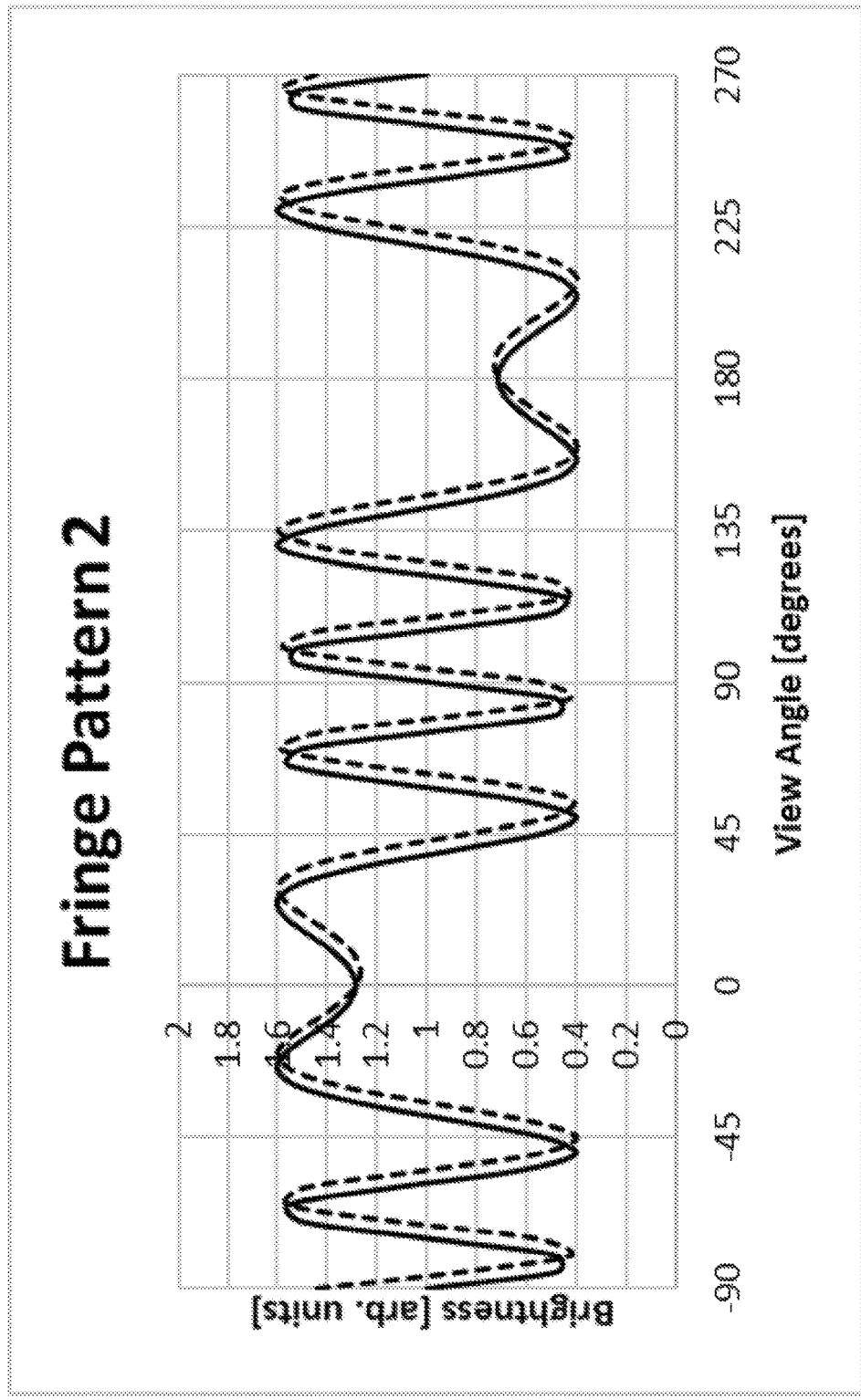
FIG. 9B is an illustrative fringe pattern plot for the output of the second output detector of the Michelson interferometer according to an embodiment of the invention.
Figure 10:
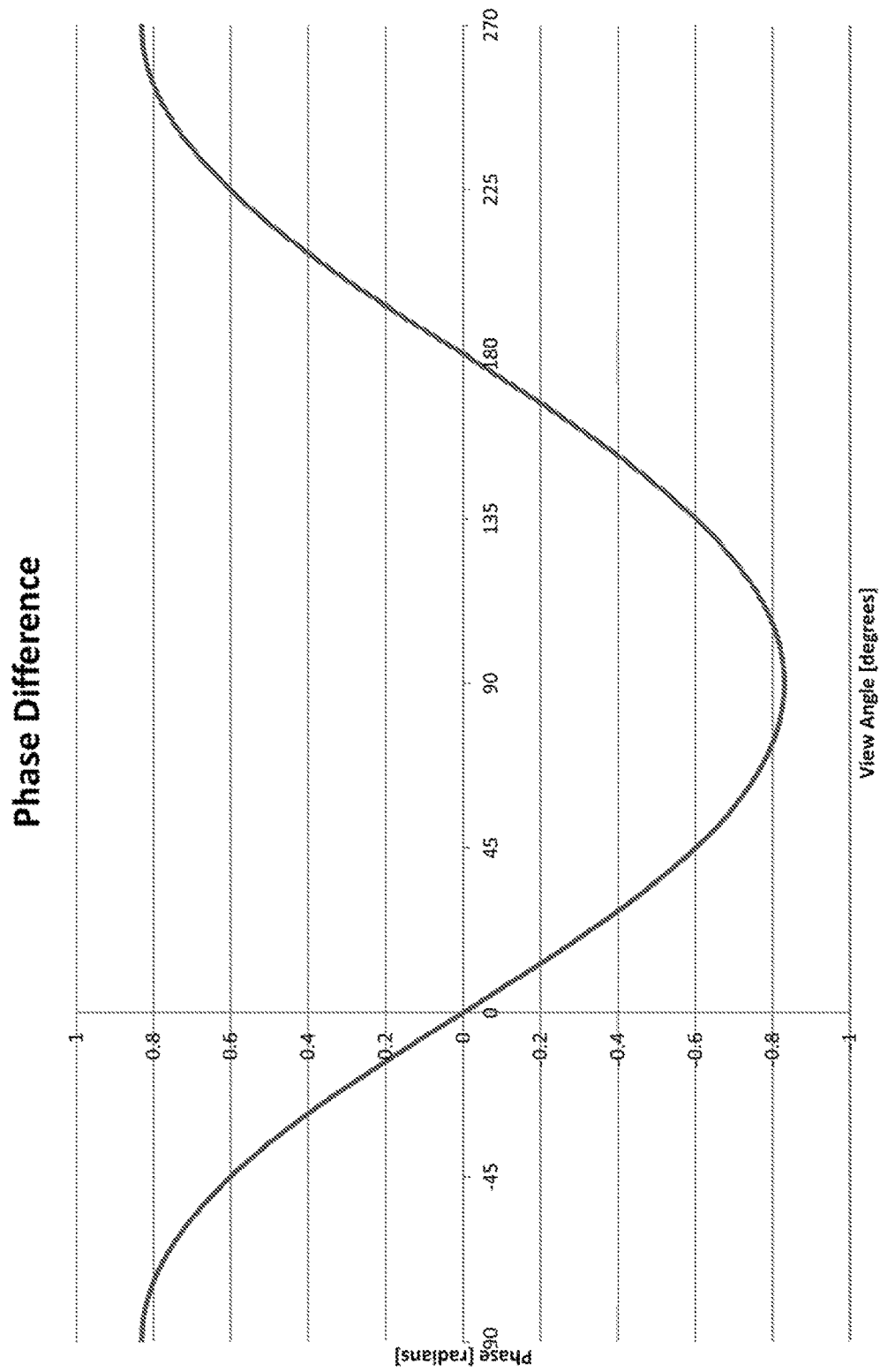
FIG. 10 is an illustrative fringe phase difference plot based on the illustrative fringe pattern plots of the first and second output detectors of the Michelson interferometer according to an embodiment of the invention.

If there is no atmospheric wind, the brightness exiting the Michelson interferometer 30 as a function of view direction will be an interference pattern representing the Doppler shift of the line due only to the projection of the spacecraft's velocity onto the view direction. In the presence of an atmospheric wind, this interference pattern is distorted in phase with the largest distortion corresponding to the direction associated with the maximum line of sight atmospheric wind. With knowledge of the interferometer path difference, spacecraft velocity and view direction, the atmospheric wind speed is determined from this phase distortion, according to this embodiment of the invention. As shown by way of example in FIGS. 9A and 9B, fringe patterns are obtained for a satellite orbiting at an altitude of 500 km viewing an emission with maximum brightness on the limb at 250 km altitude. In the example shown in FIGS. 9A and 9B, the Michelson interferometer 30 has a fixed path difference of 5 cm. The fringe pattern plot in FIG. 9A shows model fringe patterns as a function of view angle with respect to the spacecraft ram. Zero on the horizontal axis of these fringe pattern plots corresponds to looking in the ram direction of the spacecraft; or stated equivalently, the spacecraft ram is at a view angle of 0°. The solid curve in the fringe pattern plot corresponds to a stationary atmosphere, that is, where the modulation is provided only by the spacecraft's velocity. The dashed curve in the fringe pattern plot corresponds to an additional, uniform 500 m/s wind directed perpendicular to the ram velocity from 270° toward 90°. Using standard mathematical Fourier techniques, the phase of these fringe patterns is calculated, for example, as discussed in Englert et al., Doppler Asymmetric Spatial Heterodyne Spectroscopy (DASH): Concept and Experimental Demonstration, Applied Optics, 2007, Vol. 46, pp. 7297-7307, The Optical Society, Washington, D.C., USA, incorporated herein by reference. FIG. 10 shows by way of example an illustrative fringe phase plot of the phase difference in radians between the solid and dashed curves. Positive phase difference corresponds to a vector component of the atmospheric velocity toward the spacecraft.

Removing the Effect of Source and Background Brightness Variations

Because brightness variations of the airglow emission signal with view angle may be inappropriately interpreted as phase variations, they must be measured and removed in an embodiment of the invention. This can be accomplished by utilizing a dual output Michelson interferometer 30, such as shown by way of examples in FIGS. 6 and 7. The interference signal exiting one output (i.e., the first output detector 50) of the Michelson interferometer 30 is the complement of the other (i.e., the second output detector 60) and the sum of the two outputs is the source brightness with no interference fringe modulation. This sum signal can therefore be used to normalize the brightness of both outputs to remove variations due to varying source brightness. Similarly, if there is a varying continuum background signal, it can be removed by measuring it separately at a wavelength sufficiently far away from the atmospheric line using a separate standard, interference filter and detector.

Correcting for Source Temperature Variations

For a fixed path difference, the temperature of the atmospheric emitter is represented in the amplitude of the measured fringe pattern, as shown by way of illustration in FIG. 1. Lower temperatures correspond to larger amplitudes and higher temperatures correspond to smaller amplitudes. If the atmospheric temperature, corresponding to the width of the atmospheric line, changes with view direction, the amplitude of the measured fringe pattern will change as well. As long as the temperature variations are on spatial scales that are longer than the fringe modulation, this effect can be removed by monitoring the peak-to-peak amplitude of the fringe pattern. Alternatively, Fourier techniques similar to those developed for the DASH instrument at NRL can be used to remove the amplitude variation.

Correcting for Interferometer Drifts

Interferometer glasses typically expand/contract and change index of refraction with temperature. Both of these effects change the path difference which also changes the fringe phase. To mitigate these effects, thermally compensated interferometers have been developed. However, because of the high precision required for atmospheric wind measurements, additional means must typically be used to monitor the state of the interferometer with time. Two alternative, illustrative methods for monitoring and correcting for thermal drift are discussed as follows.

First illustrative method of observing a common atmospheric region from opposite directions.

If the instrument field of view rotates through 360° in azimuth as indicated above, the rotation rate is synchronized with the spacecraft velocity such that a common line of sight is measured towards the ram of the spacecraft and sometime (e.g., on the order of minutes) later in the wake of the spacecraft. Assuming these observations are sufficiently close enough in time that the instrument drift and atmospheric wind variation is small between the observations, they will measure equal and opposite wind speeds after removal of the spacecraft's projected velocity. From this measurement, the "zero wind phase" of the interferometer is determined and monitored as the interferometer drift.

Second Illustrative Method of Using an On-Board Absorption Cell

Passing the signal through an on-board absorption cell with a narrow absorption feature(s) (e.g. a standard iodine ($I_2$) absorption cell) will result in dips (i.e., reductions) in the signal at the position of the absorption(s). These dips provide an absolute reference to measure the drift of the interferometer phase.

Another embodiment of the invention includes data flow and processing steps for a velocity scanned fixed Michelson interferometer. Data created by the Michelson interferometer and the satellite attitude determination and control system, or directly derived from ADCS data include the following: 1) raw detector data simultaneously collected from the first output detector 50 and the second output detector 60 of the Michelson interferometer 30. Such raw detector data include time-tagged digital numbers; 2) field of view ("FOV") orientation data (e.g., time-tagged satellite position and FOV bore sight vector in an Earth-centered, Earth-fixed ("ECEF") coordinate system, and a corresponding view (azimuth) angle around the Earth horizon circle, wherein 0 degrees corresponds to the FOV orientation "below" the satellite ram direction and wherein 180 degrees corresponds to the FOV orientation "below" the satellite wake direction) generated by the attitude determination and control system 110 or the actuator 120; 3) a satellite velocity vector (including direction and speed, e.g., in the ECEF coordinate system); and/or 4) standard housekeeping data, e.g., interferometer temperature, and detector health data to monitor instrument state of health.

Data Analysis Steps Include the Following.

The following four data analysis steps are used to generate a calibrated signal for each of the output detectors according to an embodiment of the invention. First, time-tagged, raw detector data from first and second detector are matched with simultaneous time-tagged FOV orientations and view (azimuth) angle around the horizon circle. This results in detector data versus, view (azimuth) angle. Second, the detector dark and bias signals are subtracted from the detector data. The dark and bias values are determined, for example, via regular (e.g. once a day or once a week) measurements with a closed instrument aperture. Third, the dark corrected detector output are calibrated so that both detectors appear to have equal sensitivity. This is done, for example, using predetermined (e.g., ground based) measurements to make sure both detectors are responding equally to equal sources (also known as cross-calibration). Fourth, any spikes from spurious detector signals caused by cosmic rays or other energetic particles are corrected, using e.g., a standard data smoothness criterion, such as discussed and applied in Englert et al., Spatial Heterodyne Imager for Mesospheric Radicals on STPSat-1, J. Geophys. Res., 2010, Vol. 115, D20306, John Wiley & Sons, Hoboken, N.J., USA, incorporated herein by reference. FIGS. 9A and 9B are illustrative fringe pattern plots generated following this fourth step. As mentioned above, the solid lines correspond to an absence of atmospheric wind and the dashed lines correspond to a homogeneous wind field perpendicular to the satellite velocity direction.

The following data analysis step is used to generate a total signal for each view angle according to an embodiment of the invention. Fifth, for each full horizon circle, the simultaneous, calibrated signal data from the first and second detectors are added and the sum thereof divided by two (to average the simultaneous, calibrated data). This results in the unmodulated part of the interferograms.

The next and sixth data analysis step includes subtracting the total signal, i.e., the unmodulated part of the interferograms, from the simultaneous calibrated data of the first and second detector. In other words, the total signal is subtracted from the calibrated signal to yield the modulated signal around zero.

The following three data analysis steps are used to generate a fringe phase plot, for example, as shown by way of illustration in FIG. 10, according to an embodiment of the invention. Seventh, the modulated signal of the interferograms is divided by the total signal of the interferograms to eliminate any influence of diluent airglow brightnesses along the field of view scanning the horizon circle. Eighth, these interferograms are subtracted from each other to get a combined interferogram for each horizon circle. Ninth, the unwrapped, fringe phase of the combined interferogram is determined using standard Fourier or fitting techniques.

The following three data analysis steps are used to generate a wind velocity vector component. For the purpose of this specification, the wind vector component is the component of the wind vector parallel to the field of view; only that wind vector component causes a Doppler shift of the airglow emission signal. Tenth, a zero wind phase, which is the unwrapped phase of the interferogram fringe when there is no atmospheric wind, is determined by averaging the unwrapped phases obtained from the ram and wake observations (i.e., 0 and 180 degrees in azimuth with respect to the satellite velocity vector 80) of the same tangent point (from different horizon circle scans). This tenth step is necessary in an embodiment of the invention because thermal drifts can change the zero wind phase, e.g. on seasonal time scales in orbit. If the satellite velocity is not the same for both observations, a correction for the satellite velocity difference is necessary. One of ordinary skill in the art will readily appreciate that this ninth step assumes constant satellite velocity; in other words, the step assumes a circular satellite orbit. Eleventh, the unwrapped phases along the horizon circle resulting from the eighth step are corrected using the zero wind phase from the ninth step. Twelfth, the known satellite velocity induced fringe phase component is subtracted from the corrected unwrapped phases. Thirteenth, the wind velocity vector component along each FOV direction is determined for each measurement along the horizon circle from the wind-induced fringe phase component. ($\delta\varphi=2\pi2\Delta d/\lambda$ (v/c), where $2\Delta d$ is the phase change, $2\Delta d$ is the optical path difference in the interferometer, $\lambda$ is the wavelength of the emission line, v is the Doppler velocity, and c is the speed of light.) One of ordinary skill in the art will readily appreciate that the eleventh through thirteenth steps assume that an elliptical orbit will cause different satellite velocities along the orbit.

An embodiment of the invention includes computer program instructions, which computer program instructions embody the steps, functions, filters, and/or subsystems described herein relative to one or more of the methods of determining atmospheric wind speed described above. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus on a satellite comprising:
   a fixed-path Michelson interferometer on the satellite, said Michelson interferometer comprising an input, at least one first output detector, and at least one second output detector, said Michelson interferometer comprising a plurality of respective fields of view and a corresponding plurality of scanning azimuthal angles relative to a satellite velocity vector, the plurality of respective fields of view corresponding to a plurality of constant tangent points on an Earth horizon circle;
   one of an attitude determination and control system on the satellite, and an actuator on the satellite; and
   at least one of an input mirror and input optics on the satellite and in optical communication with said input of said Michelson interferometer;
   wherein said attitude determination and control system rotates the satellite so as to sweep through the plurality of respective fields of view around the Earth horizon circle;
   wherein said actuator rotates said at least one of said input mirror and said input optics so as to sweep through the plurality of respective fields of view around the Earth horizon circle.

2. The apparatus according to claim 1, wherein said satellite comprises a low-earth orbit satellite.

3. The apparatus according to claim 1, wherein the plurality of respective fields of view comprises a forward-looking field of view and a backward-looking field of view, the forward-looking field of view comprising a forward-looking Doppler shift-induced frequency, the backward-looking field of view comprising a backward-looking Doppler shift-induced frequency,
   wherein said Michelson interferometer comprises a path difference sufficient to generate a plurality of interference fringes between the forward-looking Doppler shift-induced frequency and the backward-looking Doppler shift-induced frequency.

4. The apparatus according to claim 1, wherein said input of said Michelson interferometer receives one of red and green airglow emission lines of atomic oxygen.

5. The apparatus according to claim 1, wherein the Earth comprises a limb,
   wherein each respective field of view of the plurality of respective fields of view comprises a plurality of vertical field-of-view segments, the plurality of field-of-view segments respectively corresponding to a plurality of tangent point heights for a plurality of lines-of-sight across the limb of the Earth,
wherein said at least one first output detector comprises a plurality of stacked first output detectors, each first output detector of said plurality of stacked first output detectors corresponding to a respective field-of-view segment of the plurality of field-of-view segments, said each first output detector of said plurality of stacked first output detectors corresponding to a respective tangent point height of the plurality of tangent point heights,
wherein said at least one second output detector comprises a plurality of stacked second output detectors corresponding to the plurality of stacked first output detectors, each second output detector of said plurality of stacked second output detectors corresponding to the respective field-of-view segment of the plurality of field-of-view segments, said each second output detector of said plurality of stacked second output detectors corresponding to the respective tangent point height of the plurality of tangent point heights.

6. The apparatus according to claim 1, wherein said Michelson interferometer comprises a first beam splitter communicating with said input of said Michelson interferometer, a first interferometer mirror optically communicating with said first beam splitter, a second interferometer mirror communicating with said first interferometer mirror, a second beam splitter communicating with said first beam splitter and said second interferometer mirror,
wherein said at least one first output detector and said at least one second output detector communicate with said second beam splitter via respective optics.

7. The apparatus according to claim 1, wherein said Michelson interferometer comprises a single beam splitter comprising a first surface and a second surface, a first roof top mirror communicating with said single beam splitter via said first surface, a second roof top mirror communicating with said single beam splitter via said second surface,
wherein said at least one first output detector and said at least one second output detector communicate with said single beam splitter.

8. The apparatus according to claim 1, wherein said attitude determination and control system comprises at least one of a plurality of thrusters, a plurality of reaction wheels, a global positioner, and a star tracker.

9. The apparatus according to claim 1, wherein said actuator comprises one of a stepped-motion motor and a continuous motion motor.

10. The apparatus according to claim 1, wherein at least one of said at least one first output detector and said at least one second output detector comprises one of a charge-coupled device, a complementary metal-oxide semiconductor detector, and a photodiode.

11. A method comprising:
providing on a satellite a fixed-path Michelson interferometer, the Michelson interferometer comprising an input, at least one first output detector, and at least one second output detector, the Michelson interferometer comprising a plurality of respective fields of view and a corresponding plurality of scanning azimuthal angles from a satellite velocity vector, the plurality of respective fields of view corresponding to a plurality of constant tangent points on an Earth horizon circle;
sweeping through the plurality of respective fields of view around the horizon circle by one of rotating the satellite using an attitude determination and control system and rotating, using an actuator, at least one of an input mirror and input optics communicating with the input of the Michelson interferometer;
detecting using the at least one first output detector a first raw detector data, and detecting using the at least one second output detector a second raw detector data;
generating a combined interferogram based on the first raw detector data and the second raw detector data;
determining an unwrapped phase from the combined interferogram;
determining a zero wind phase;
correcting the unwrapped phase based on the zero wind phase;
generating a wind-induced fringe phase difference by subtracting a satellite velocity-induced fringe phase from the corrected unwrapped phase; and
generating from the wind-induced fringe phase difference a wind speed vector component for the each respective field of view of the plurality of respective fields of view.

12. The method according to claim 11, further comprising:
detecting using one of the attitude determination and control system, and the actuator the plurality of respective fields of view and the corresponding plurality of view angles around the horizon circle.

13. The method according to claim 11, further comprising:
correlating the first raw detector data and the second raw detector data to the corresponding plurality of view angles;
generating a first calibrated signal from the first raw detector data for each view angle of the plurality of view angles and generating a second calibrated signal from the second raw detector data for the each view angle of the plurality of view angles along the horizon circle;
calculating a total unmodulated signal from the first calibrated signal and the second calibrated signal for the each view angle of the plurality of view angles; and
generating for the each view angle of the plurality of view angles a first modulated signal by subtracting the total unmodulated signal from the first calibrated signal, and generating a second modulated signal by subtracting the total unmodulated signal from the second calibrated signal.

14. The method according to claim 13, further comprising:
correcting the first modulated signal and the second modulated signal for brightness differences along the horizon circle.

15. The method according to claim 14, wherein said correcting the first modulated signal and the second modulated signal for brightness differences comprises dividing the first modulated signal by the total unmodulated signal and dividing the second modulated signal by the total unmodulated signal.

16. The method according to claim 13, wherein said generating the combined interferogram comprises subtracting the first modulated signal from the second modulated signal.

17. The method according to claim 11, wherein the first raw detector data, the second raw detector data, the plurality of respective fields of view, and the corresponding plurality of view angles are time-tagged,
the method further comprising:
matching the first raw detector data to the plurality of respective fields of view, and the corresponding plurality of view angles; and
matching the second raw detector data to the plurality of respective fields of view, and the corresponding plurality of view angles.

18. The method according to claim 11, further comprising:
- correcting the first raw detector data by subtracting at least one of at least one first detector dark current signal, at least one first bias signal, and at least one first spurious signal from one of at least one energetic particle and cosmic radiation from the first raw detector data; and
- correcting the second raw detector data by subtracting at least one of at least one second detector dark current signal, at least one second bias signal, and at least one second spurious signal from the one of at least one energetic particle and cosmic radiation from the second raw detector data.

19. The method according to claim 18, wherein said generating the first calibrated signal and generating the second calibrated signal comprises calibrating the at least one first output detector based on the corrected first raw detector data and calibrating the at least one second output detector based on the corrected second raw detector data to ensure equal and linear sensitivity.

20. The method according to claim 13, wherein said calculating a total unmodulated signal comprises averaging the first calibrated signal and the second calibrated signal.

* * * * *